United States Patent [19]

Taniguchi et al.

[11] Patent Number: 4,676,645

[45] Date of Patent: Jun. 30, 1987

[54] OPTICAL INSTRUMENT FOR MEASURING DISPLACEMENT

[75] Inventors: Kayoko Taniguchi, Kamakura; Hideki Tsuchiya, Tokyo; Masaaki Toyama, Urawa, all of Japan

[73] Assignee: Sony Magnescale Incorporation, Tokyo, Japan

[21] Appl. No.: 668,097

[22] Filed: Nov. 5, 1984

[30] Foreign Application Priority Data

Nov. 4, 1983 [JP] Japan .................. 58-205956
Oct. 1, 1984 [JP] Japan .................. 59-205853
Oct. 1, 1984 [JP] Japan .................. 59-205854

[51] Int. Cl.$^4$ .............................................. G01B 9/02
[52] U.S. Cl. ............................. 356/356; 250/237 G; 356/363
[58] Field of Search .................. 356/355, 356, 363; 250/237 G

[56] References Cited

U.S. PATENT DOCUMENTS 3,738,753  6/1973  Huntley, Jr. ........... 250/237 G X
3,756,723  9/1973  Hock ..................... 250/237 G X

FOREIGN PATENT DOCUMENTS 1367886  9/1974  United Kingdom ........... 356/356

Primary Examiner—Davis L. Willis
Assistant Examiner—Matthew W. Koren
Attorney, Agent, or Firm—Hill, Van Santen, Steadman & Simpson

[57] ABSTRACT

Optical instrument for measuring displacement comprising a movable diffraction grating used as a scale, a semiconductor laser device, photodetectors, and means for making two light beams diffracted by the diffraction grating interfere with each other in which displacement of said diffraction grating is measured, based on variations of interference signals. The laser device has a suitable coherency for making selectively two necessary light beams with equal optical path lengths interfere with each other.

9 Claims, 17 Drawing Figures

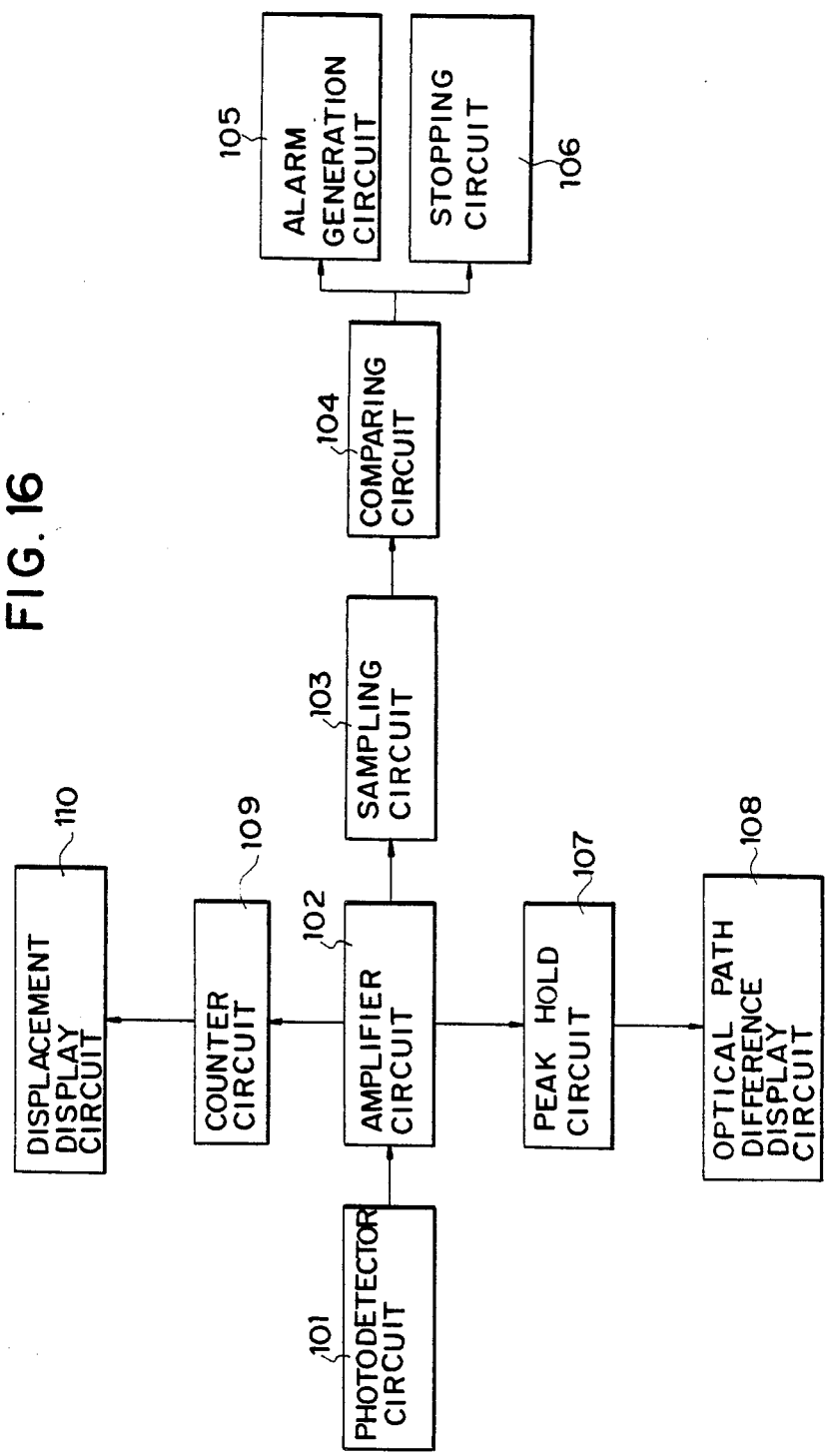

OPTICAL INSTRUMENT FOR MEASURING DISPLACEMENT

FIELD OF THE INVENTION

This invention relates to an optical instrument for detecting displacement of a scale, utilizing interference of light, in particular to such an instrument utilizing a multimode semiconductor laser device as a light source.

BACKGROUND OF THE INVENTION

Among various optical instruments for measuring displacement, which can detect variations in position (length of displacement) of a diffraction grating by making diffracted light interfere, using a displacing diffraction grating as a scale, are known a type of instrument for which variations in wavelength are essentially permitted, in which detection of displacement is effected by utilizing interference between diffracted light beams of same order with different signs, plus and minus, as disclosed in the publication of Japanese Utility Model No. 81510/1982 or the provisional publication of Japanese Patent No. 191907/1983, and also another type of instruments in which detection of displacement is effected by utilizing interference between diffracted light beams of 1st order, as disclosed in Japanese Patent Application No. 205956/1983.

Since all of these prior art optical instruments for measuring displacement are so designed that their optical system is not subject to influences, such as elimination of interference, etc., due to variations in wavelength of the light source within a permissible range, they have an advantage that it is possible to use a light source, which is defective in wavelength stability, but is not expensive, such as a semiconductor laser device.

On the other hand, however, in order that these optical systems can manifest their desired characteristics, it is necessary to adjust them in such a manner that optical path lengths of two beams split by means of a beam splitter or diffraction grating in their interferometer, diffracted and finally made interfere vary always equally. The reason why this is absolutely necessary is as follows. If their optical path lengths differed from each other, phase variations in interference signals would be caused by variations in wavelength at the same time as phase variations due to displacement of the diffraction grating which is to be measured, which gives rise to measurement errors.

In order to avoid such a drawback, adjustment precision of the optical path lengths of the two beams mentioned above should be, for example, from several 10 $\mu$m to several 100 $\mu$m in the case where a semiconductor laser device is used without temperature compensation, although it is not possible to speak generally, because it depends on variations in wavelength which are to be allowed and required precision as well as on the displacement length of the diffraction grating, to which a period of the interference signals corresponds.

It has been thought that for this purpose a high precision supporter for an optical system or a jig for positioning it was necessary. The former was expensive and the latter gave rise to problems in that high precision was required for adjustment, and that when fixing means such as screws were loosened, troubles were often caused in the optical system, which caused measurement errors. Furthermore, in the case where a coherent light source such as a single mode laser and so forth was used, it was necessary to dispose expensive non-reflection coating on optical parts, because it was feared that phase shifts might be produced in interference signals due to superposition of unnecessary reflected light coming from surfaces of optical parts.

In spite of these countermeasures it was difficult to keep adjustment precision within a desired range.

SUMMARY OF THE INVENTION

This invention has been made in order to take measures against the problems mentiond above and an object of this invention is to provide an optical instrument for measuring displacement, which eliminates the drawbacks of the prior art techiques by detecting a difference between the optical path lengths of the two beams and by adjusting the optical path lengths without any special high precision elements or mechanisms and to make selective light beams interfere with each other.

In order to achieve this object, according to this invention, a suitably coherent multimode semiconductor laser is used as a light source and interference between two light beams diffracted by a diffraction grating is measured.

The invention is described in more detail below using some preferred embodiments.

BRIEF DESCRIPTION OF THE DRAWINGS

FIG. 16 is a block diagram showing an example of the circuit displaying the difference of the optical path lengths in the embodiment shown in FIG. 1 and generating alarm and stop signals.

DESCRIPTION OF PREFERRED EMBODIMENTS

Figure 1:
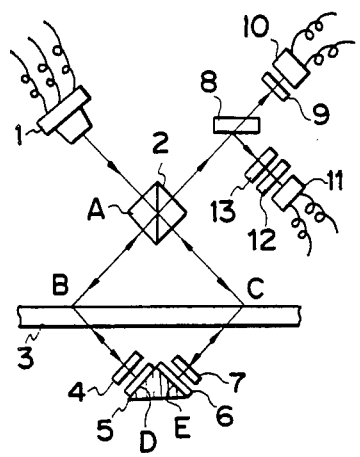
FIG. 1 is a schematic side view showing an example of the construction of an optical instrument for measuring displacement according to this invention.

FIG. 1 is a scheme showing the construction of an optical instrument for measuring displacement according to an embodiment of this invention, in which reference numeral 1 denotes a light source consisting of a multimode semiconductor laser device; 2 is a beam splitter for splitting a light beam into two; 3 is a diffraction grating used as a scale; 4, 7 and 13 are λ/4 plates; 5 and 6 are a pair of mirrors; 8 is a half mirror; 9 and 12 are polarizing plates; and 10 and 11 are photodetectors.

In the device constructed as described above, a light beam emerging from the multimode semiconductor laser device 1 enters the beam splitter 2 and is split at A into two beams, which proceed further toward B and C on the diffraction grating 3. Each of the light beams entering the diffraction grating 3 is diffracted and projected through a λ/4 plate 4 or 7 on a mirror 5 or 6. Each beam is reflected at D or E and enters again the diffraction grating 3. The beams diffracted again by the diffraction grating 3 return to the beam splitter 2 and interfere therein with each other. Thereafter they are projected through the half mirror 8 on the photodetectors 10 and 11, which detect interference intensity. In this manner displacement of the diffraction grating 3 used as a scale is measured.

In general, visibility of interference fringes in an interferometer is determined by coherency of the light source and by the difference between optical path lengths of the two interfering beams. For a coherent light source such as a laser device, in which single mode oscillation takes place, visibility is not lost, even if the difference between the two optical path lengths is great. To the contrary, in the case where a light source, whose coherency is not so good, is used, it is known that visibility of interference fringes changes, when the difference between the two optical path lengths varies.

This invention has been made by applying this principle to the optical instrument for measuring displacement.

In the device shown in FIG. 1, in order that errors cannot be caused by variations in wavelength of the mulitmode semiconductor laser device 1, it is necessary that the path A→B→D and the path A→C→E of the light beams split by the beam splitter 2 are so adjusted that their lengths are equal. In this case, precision of this adjustment depends on temperature conditions of the environment, in which the optical system is placed.

For example, a commercially available semiconductor laser has a characteristic of wavelength to temperature variation which is about 0.3 nm/°C. Assuming that the range of temperature variations is ±10° C. and that the wavelength is 780 nm, the pitch of the diffraction grating in this optical system is approximately 0.55 μm.

Further, assuming that the required precision is 0.1 μm, the difference Δl between the two optical path length should be within the range which is determined by $$0.1 \mu m > (\Delta\lambda/\lambda^2) \cdot 2 \cdot \Delta l \cdot (P/4)$$

where
λ: is the wavelength of the light source
P: is the pitch of the grating.

In this case, the tolerance variation for Δl is about 70 μm.

In order that this difference can be monitored it is necessary to use a light source which allows the detection of variations in Δl of this order of magnitude and moreover which has a suitable coherence of which the visibility does not vary too much for Δl smaller than this value, because it is difficult to manipulate the device, when it is too sensitive to Δl.

When a suitable multimode semiconductor laser device is used according to this invention, these conditions are fulfilled and it is possible to obtain variations in modulation for suitable variations in Δl. that is, to detect variations in difference between the two optical path lengths as variations in modulation.

Figure 2:
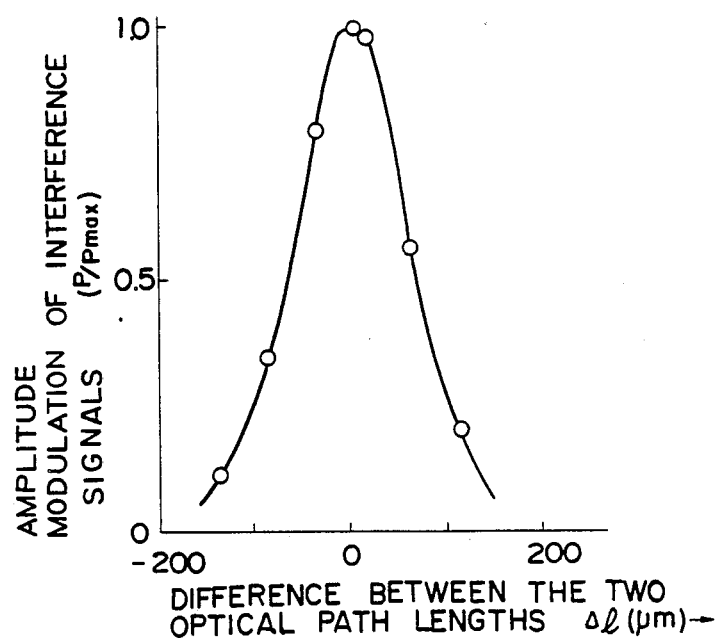
FIG. 2 is a graph of an example of the characteristic curve indicating a relation between the amplitude of interference signals and the difference between two optical path lengths.

FIG. 2 is a graph showing the relationship between the difference Δl between the two optical path lengths and the amplitude modulation of interference signals, obtained experimentally by means of a device arranged as indicated in FIG. 1.

As can be seen in FIG. 2, it is understood that adjustment of the optical path lengths can be effected with fairly high precision.

For an optical system having a lower precision, a multimode semiconductor laser device having fewer oscillation modes than that described above can be used. In this case, characteristic curves varying mode slowly than that shown in FIG. 2 are obtained. When use of a single mode laser device is desired, a multimode laser device is used only during adjustment of the optical system and after completion of the adjustment, it can be replaced by the original single mode laser device.

Furthermore, in the case where a multimode semiconductor laser device is used, when a difference between the two optical path lengths is caused for some reason, since the difference manifests itself as a lowering of output signals and can be detected, an operator will not use the output since he knows that errors due to variations in wavelength are is prevented. Further, since only interference between two beams having small Δl can be selectively detected, it can be avoided that interference signals are varied by interference with unnecessary light reflected by surfaces of optical parts and thus precision can be increased. In addition, since it is possible not to use non-reflection coating on optical parts, optical parts which are not expensive can be used. It is also possible to improve S/N ratio with respect to that obtained when a single mode semiconductor laser device is used.

FIG. 16 is a block diagram showing an example of the circuit displaying the difference of the optical path lengths in the embodiment shown in FIG. 1 which generates alarm and stop signals. Detection signals obtained by using a photodetector circuit 101 comprising the photodetectors 10 and 11 are sent through an amplifier circuit 102 to a counter circuit 109, whose output signals drive a displacement display circuit 110, where magnitude of the displacement is displayed. At the same time, the detection signals are sent from the amplifier circuit 102 through a peak hold circuit 107 to an optical path difference display circuit 108, which displays the difference between the optical path lengths of the two beams. Moreover the detection signals are sent also from the amplifier circuit 102 to a sampling circuit 103, whose sampling output signals are sent through a comparing circuit 104 to an alarm generation circuit 105, which produces alarm signals. The sampling output signals control also a stopping circuit 106, which stops the devices belonging to the measuring system.

Figure 3:
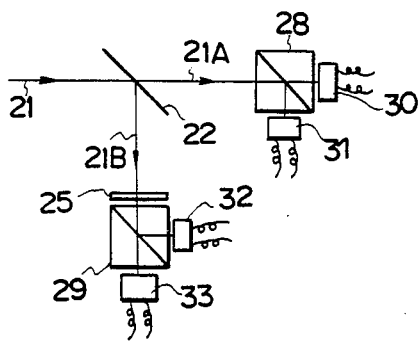
FIG. 3 is a plan view showing an arrangement of signal detectors, which can be used in an optical instrument for measuring displacement according to this invention.
Figure 4:
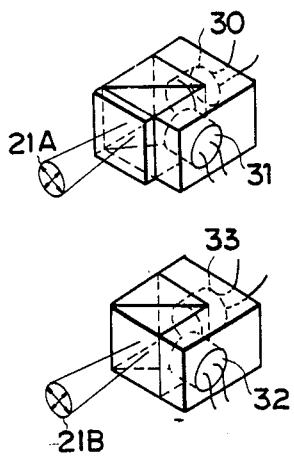
FIG. 4 is a perspective view of the signal detectors shown in FIG. 3.

FIG. 3 is a scheme showing an example of the concrete construction of a signal detector, which can be used in a device according to this invention. Reference numerals 28 and 29 denote polarizing beam splitters and 30 to 33 represent photodetectors. FIG. 4 shows a concrete construction of the polarizing beam splitters 28 and 29 and photodetectors.

An interference light beam 21 produced by the two beams is split into two, 21A and 21B, by a half mirror 22 and thereafter each of the split beams 21A and 21B is further split by means of a polarizing beam splitter 28 or 29 into two beams, which are directed toward two directions different by 90° from each other and projected to photodetectors 30, 31 or 32, 33. That is, after interference, components parallel to the sheet of the figure emerge toward the photodetector 30 and components perpendicular to the sheet emerge toward the photodetector 31.

In this case, the phases of the two interference signals are different by 180° from each other and their intensities are almost equal.

On the other hand, the relation between the two split beams coming from the light beam reflected by the half mirror 22, passing through a λ/4 plate 25 and directed toward the detectors 32 and 33 is the same as that between the split beams directed toward the detectors 31 and 30.

Figure 5:
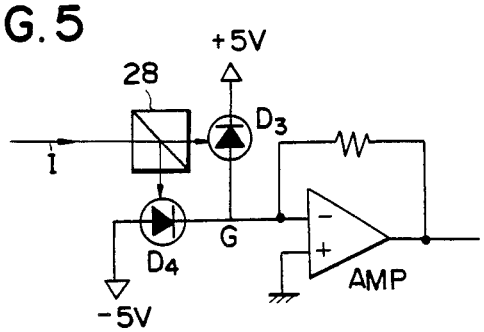
FIG. 5 is a circuit diagram of a cancelling circuit associated to the signal detectors shown in FIG. 3.

FIG. 5 is a circuit diagram of a cancelling circuit used in the device according to this invention, in which $D_3$ and $D_4$ represent photodiodes and AMP denotes an amplifier. Two such cancelling circuits are disposed, corresponding to the polarizing beam splitters 28 and 29.

The polarizing beam splitter 28 will be explained as an example. The 1st photodiode $D_3$ is located at the position for the photodetector 30 and the 2nd photodiode $D_4$ is located at the position for the photodetector 31. Furthermore, these 1st and 2nd photodiodes $D_3$ and $D_4$ are connected in series, and at the same time their connecting point is connected with the input terminal of the amplifier AMP. To the 1st and 2nd diodes $D_3$, $D_4$ are connected reverse bias sources.

Figure 6A:
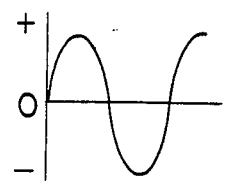
FIGS. 6(a) and (b) show waveforms at outputs of the signal detectors shown in FIG. 3.

In the circuit described above, since the D.C. components of the 1st and 2nd photodiodes $D_3$, $D_4$ are cancelled by each other at the connecting point G between them, the amplitude is doubled and large detected signals as shown in FIG. 6(a) can be obtained at the output of the amplifier AMP.

Figure 6B:
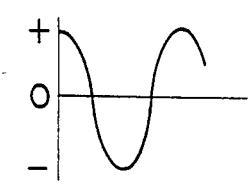

Since the polarizing beam splitter 29 acts in the same manner as that described above, large detected signals, whose phase is different by 90° from that indicated in FIG. 6(a), as shown in FIG. 6(b), can be obtained at the output terminal.

Figure 7:
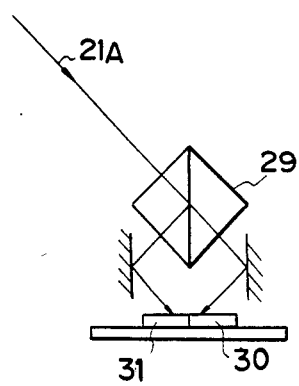
FIG. 7 is a side view showing an example of the concrete construction of the photodetectors shown in FIG. 3.

According to this invention, if the characteristics of the two photodiodes connected in series are identical, signals containing no unnecessary components such as a D.C. component, dark current and so forth are applied to the input of the amplifier AMP and are amplified with a high gain. Therefore, it is possible to obtain large output signals. Moreover, if two photodiodes formed on a same substrate, as indicated in FIG. 7, are used, it is possible to obtain output signals having still higher quality.

As explained above, when the signal detecting parts is constructed as indicated above, large detected signals can be obtained.

According to this invention, since D.C. components can be cancelled with a few components by combining extremely simple optical parts with a cancelling circuit, it is possible to obtain detected signals, which are not only large but also of high quality, and thus the reliability of the device is improved.

Figure 8:
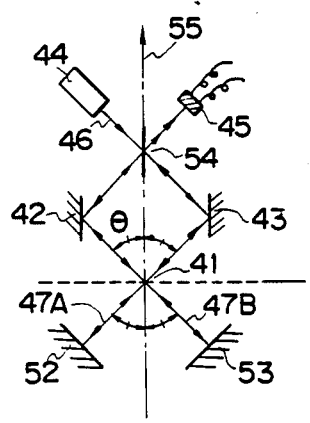
FIG. 8 is a scheme for explaining the working principle of an optical instrument for measuring displacement according to this invention.

FIG. 8 shows another example of the construction of the optical instrument for measuring displacement according to this invention, in which reference numeral 41 represents a diffraction grating used as a scale; 42 and 43 are a pair of mirrors; 52 and 53 are another pair of mirrors; 44 is a light source; 45 is a photodetector; 54 is a beam splitter for splitting the light beam emerging from the light source into two; and 55 denotes a normal to the diffraction grating 41.

In the arrangement of the device described above the light beam 46 emerging from the light source 44 and projected on the beam splitter 54 is split into two, that is, the light beam 46A directed to the mirror 42 and the light beam 46B directed to the mirror 43. The light beams 46A and 46B are projected through the mirrors 42 and 43, respectively, on the diffraction grating 41 on both sides of the normal axis 55 with equal incident angles. The diffraction grating 41 is so disposed that grating vector is directed horizontally on the sheet of the figure, and that the direction of the displacement to be measured of the diffraction grating 41 used as a scale coincides with the direction of the grating vector. Thus, the light beam 46A reflected by the mirror 42 is further so diffracted that it is projected on the mirror 52, and at the same time the light beam 46B reflected by the mirror 43 is further so diffracted that it is projected on the mirror 53. In this case, the incident light beams 46A and 46B are so diffracted that the optical axis of one of the diffracted light beams 47A or 47B coincides with the optical axis of the others incident light beam.

Thereafter the diffracted light beams 47A, 47B are reflected by the mirrors 52, 53 and projected again on the diffraction grating 41. Here they are again diffracted. Thus the diffracted light beam 47A coming from the mirror 52 is projected on the mirror 42 and the diffracted light beam 47B coming from the mirror 53 is projected on the mirror 43. They are reflected there and return to the beam splitter 54. In this beam splitter 54 the optical axis of the transmitted light beam of that reflected by the mirror 42 coincides with that of the reflected light beam of that reflected by the mirror 43 and they interfere with each other. Therefore, the displacement of the diffraction grating 41 used as a scale is measured by detecting this interference intensity by means of the photodetector 45. In this case the detection signals and the displacement are related as follows.

The complex amplitudes (excepting the term varying in time) $E_1$, $E_2$ of the two incident beams passing through the origin after having been reflected by the mirrors 42, 43 can be expressed as follows.

$$E_1 = A_1 e^{i(k\sin\theta \cdot x - k\cos\theta \cdot y - \phi_1)} \quad (1)$$

$$E_2 = A_2 e^{i(-k\sin\theta \cdot x - k\cos\theta \cdot y - \phi_2)} \quad (2)$$

where $\theta$ denotes the incident angle; $k$ represents the wave-number of light of the used light source; and $\phi_1$ and $\phi_2$ are variations in phase on the optical paths during the interval from the point 0 when the original beam is splitted by the beam splitter into two to the moment when the splitted beams are projected on the diffraction grating.

Moreover, the transmission coefficient T can be expressed by the following equation.

$$T = \cos(Kx - \psi) \quad (3)$$

where K is the grating vector of the diffraction grating, $2\pi/\Lambda$ ($\Lambda$ is the wavelength of the diffraction grating), and represents the phase of the grating.

Putting $K = 2k \sin\theta$ so that the grating vector K satisfies the diffraction condition described above, the equation (3) can be transformed as follows.

$$T = \frac{e^{i(2kx\sin\theta - \psi)} + e^{-i(2kx\sin\theta - \psi)}}{2} \quad (4)$$

The diffracted light beam is expressed by the product of $E_1$, $E_2$ and T and thus $E_{11}$ and $E_{21}$ representing the respective diffracted light of 1st order are expressed as follows.

$$E_{11} = A_{11}\{e^{i(-k\sin\theta \cdot x - k\cos\theta \cdot y - \phi_1 + \psi)}\} \quad (5)$$

$$E_{21} = A_{21}\{e^{i(k\sin\theta \cdot x - k\cos\theta \cdot y - \phi_2 - \psi)}\} \quad (6)$$

If for the grating a volume type hologram is used, almost no light appears except for the diffracted light of the 0th order and that of the 1st order. In this case the propagation direction of one of the two diffracted light beams coincides with the incident direction of the other and their phases differ from each other by P expressed by the following equation.

$$P = -\phi_1 + \psi - (-\phi_2 - \psi) = \phi_2 - \phi_1 + 2\psi \quad (7)$$

Putting now $\phi_3$ and $\phi_4$ for phase variations of these diffracted light beams from the moment when these diffracted light beams are reflected by the mirrors 52 and 53 to the moment when they are projected on the diffraction grating 41, respectively, the complex amplitudes $E_{12}$, $E_{22}$ of the beams just before they return to the diffraction grating 41 and are projected thereon can be expressed as follows.

$$E_{12} = A_{12}\{e^{i(k\sin\theta \cdot x + k\cos\theta \cdot y - \phi_1 - \phi_3 + \psi)}\} \quad (8)$$

$$E_{22} = A_{23}\{e^{i(-k\sin\theta \cdot x + k\cos\theta \cdot y - \phi_2 - \phi_4 - \psi)}\} \quad (9)$$

$E_{13}$ and $E_{23}$ being complex amplitudes of the diffracted light beams of 1st order of the beams projected again on the diffraction grating 41 and diffracted by it, respectively, they can be calculated in the same manner as the equations mentioned above (5) and (6), as follows.

$$E_{13} = A_{13}\{e^{i(-k\sin\theta \cdot x + k\cos\theta \cdot y - \phi_1 - \phi_3 + 2\psi)}\} \quad (10)$$

$$E_{23} = A_{23}\{e^{i(k\sin\theta \cdot x + k\cos\theta \cdot y - \phi_2 - \phi_4 - 2\psi)}\} \quad (11)$$

Moreover, paying attention only to the diffracted light beams of 1st order, it can be understood that there are waves propagating in the reverse direction along the same paths as that of the incident light beams.

When these waves enter the beam splitter 54 the light beams reflected by the mirror 42 proceeds straight and on the other hand that reflected by the mirror 43 is reflected so that these two beams have the same optical axis. Putting $\phi_5$ and $\phi_6$ for phase variations on the two beams until this moment, $E_{14}$ and $E_{24}$, which are complex amplitudes of the two beams, when they begin to interfere, can be expressed by the following equations.

$$E_{14} = A_{14}\{e^{i(k\sin\theta \cdot x + k\cos\theta \cdot y - \phi_1 - \phi_3 - \phi_5 + 2\psi)}\} \quad (12)$$

$$E_{24} = A_{24}\{e^{i(k\sin\theta \cdot x + k\cos\theta \cdot y - \phi_2 - \phi_4 - \phi_6 - 2\psi)}\} \quad (13)$$

Further, interference intensity can be represented as follows.

$$I = (E_{14} + E_{24})(E_{14} + E_{24})^* = \{A_{14}^2 + A_{24}^2 + 2A_{14} \cdot A_{24} \cdot \cos(\phi_2 + \phi_4 + \phi_6 - \phi_1 - \phi_3 - \phi_5 - 4\psi) \quad (14)$$

where $C = (\phi_2 + \phi_4 + \phi_6 - \phi_1 - \phi_3 - \phi_5)$ is a constant which does not vary, even if the diffraction grating used as a scale moves. When the optical path lengths of the two beams are equal, $C = 0$ and in this case the interference intensity I can be expressed as follows.

$$I = A_{14}^2 + A_{24}^2 + 2A_{14} \cdot A_{24} \cdot \cos(-4\psi) \quad (15)$$

Examining this equation, it can be understood that phase variations, which are 4 times as great as corresponding phase variations of the scale, appear in the interference signals. Putting 1 for the displacement of the scale, the phase of the diffraction grating $\psi$ can be calculated by the following equation.

$$\psi = l \cdot K = l \cdot 2k \sin\theta = l \cdot 2 \cdot (2\pi/\lambda) \cdot \sin\theta \quad (16)$$

In this case, by utilizing the relation $2\pi = 4\psi = 4 \cdot 2 \cdot (2\pi/\lambda) \sin\theta \cdot L$, the displacement L corresponding to one period of the interference signal can be expressed by the following equation:

$$L = \lambda/8 \cdot \sin\theta = (\Lambda/4) \quad (17)$$

As an example, assuming $\lambda = 7800$ Å, $\theta = 45°$, and using eq. (17), $L = 0.78/8 \sin 45° \approx 0.78/8 \times 0.707 \approx 0.138$ μm can be obtained.

In the case where this value is assumed to be standard, dividing the period by ten or more, it is possible to measure a displacement of an order of 1/100 μm. Moreover, when the optical path lengths of the two beans are equal, even if the wavelength of the light source varies, phase variations in the optical paths are also equal. Thus $C = 0$ and interference signals which are invariant for variations in wavelength of the light source are obtained. Futher, even in the case where a light source, whose range of oscillation wavelength is large and which is not completely coherent, is used, if C is small, it is possible to obtain interference signals.

In the instrument according to this invention, as it is evident from the facts mentioned above, even if the wavelength of the light source varies, the optical path lengths of the two beams vary equally. Consequently, the instrument according to this invention is so constructed that the difference between the optical path lengths C is maintained always equal to 0. This situation is kept also, when the scale (diffraction grating) moves vertically.

Figure 9:
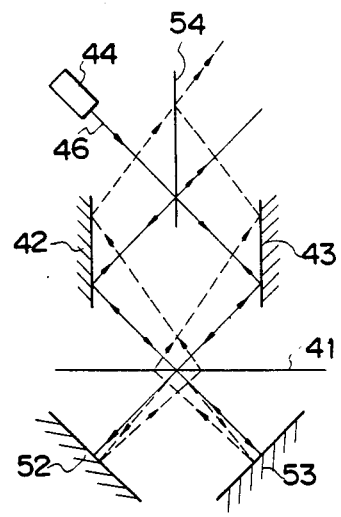
FIGS. 9 and 10 are schemes for explaining the same working principle as that of FIG. 8 for two different cases.

FIG. 9 shows a example showing the optical paths, in which the broken lines indicate optical paths in the case where the wavelength of the light source 44 varies. As indicated in the figure, since the optical paths of the two beams vary symmetrically, no variations in difference between the optical path lengths appear, and therefore the interference is not destroyed, because angular shifts at the end of the optical paths are also equal.

Further, although the position of the second diffraction is displaced on the diffraction grating in the figure, since the optical paths vary symmetrically in the horizontal direction with respect to those before the variation in wavelength, influences of the variations in the optical path lengths are cancelled by each other and thus they do not give rise to any phase variations in detected signals.

Moreover, although the position of the interference beam emerging from the beam splitter 54 is more or less displaced, when the range of variations in wavelength is small, this displacement is extremely small. In consequence, if the photodetector 45 is sufficiently wide with respect to the displacement, no problems are produced.

Figure 10:
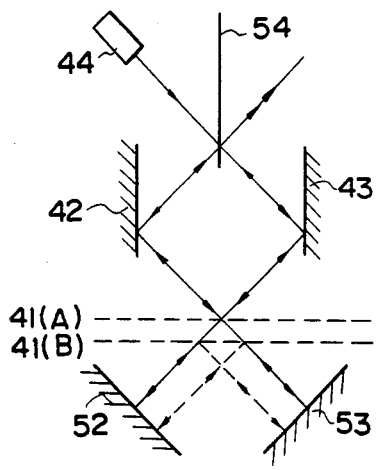

FIG. 10 is a scheme where the diffraction grating 41 is moved vertically. In this case, even if the diffraction grating is displaced from 41(A) to 41(B) and the optical paths vary as indicated by the broken lines, the position of the diffraction varies symmetrically in the same manner as for the variations in wavelength described above, influences of the vertical displacement of the diffraction grating are cancelled by each other.

Figures 11, 12:
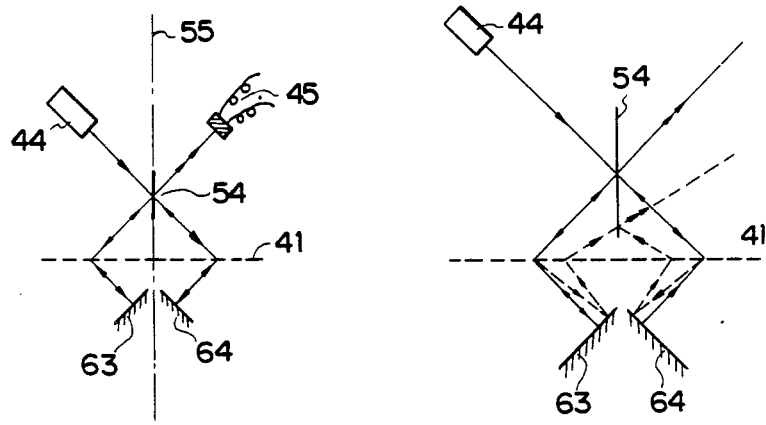
FIG. 11 is a scheme for explaining the working principle of another optical instrument for measuring displacement according to this invention.
FIGS. 12 and 13 are schemes for explaining the same working principle as that of FIG. 11 for two different cases corresponding to FIGS. 9 and 10, respectively.

FIG. 11 is a scheme showing the construction of another optical instrument for measuring displacement according to this invention, which is so constructed that the diffracted beams are reflected by a pair of mirrors 63, 64 and a beam splitter 54 makes them interfere with each other.

Figure 13:
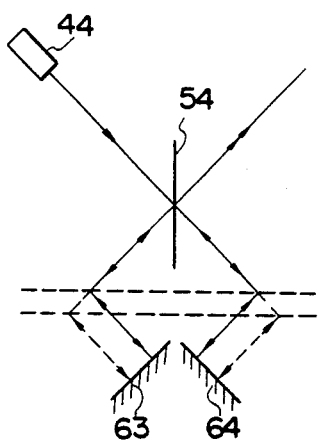

FIGS. 12 and 13 are schemes when variations in wavelength of the light source 44 are produced and when the diffraction grating 41 is displaced vertically, respectively, in the device shown in FIG. 9. Since influences of these variations are cancelled by each other by the same reason as that for FIGS. 10 and 11, also in these cases they do not give rise to problems.

As other characteristics of the instrument according to this invention it can be cited that the incident angle $\theta$ and the diffraction angle $\theta'$ of the two beams are equal. By this reason the diffraction of the two beams can satisfy, besides the grating equation consisting of $$k \sin \theta - k \sin \theta' = Kx = K. \qquad (18)$$

another equation $$k \cos \theta - k \cos \theta' = Ky = 0 (\because \theta = \theta'). \qquad (19)$$

This means that two diffractions by a grating having a grating vector in the x direction of the two beams both satisfy Bragg's condition. Consequently, it is possible to obtain a high diffraction efficiency by using a volume type hologram.

Figure 14:
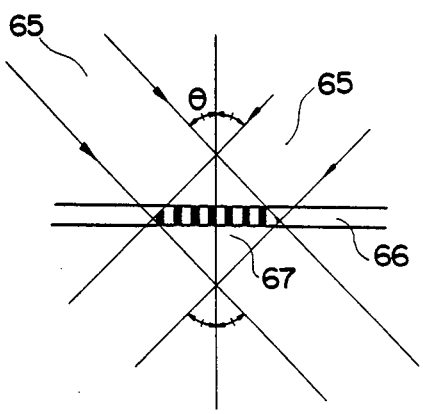
FIG. 14 is a schematical view showing the interior of a hologram used as a diffraction grating in an optical instrument for measuring displacement according to this invention.

FIG. 14 is a schematical view showing the interior of a hologram at recording, when a volume type hologram is used, in which reference numeral 65 denotes a coherent plane wave; 66 represents recording medium; and 67 is an enlarged view showing the interior of the hologram. The grating surface is perpendicular to the surface of the hologram. It is possible to obtain a high diffraction efficiency, which is as high as nearly 100%, by suitably selecting a material for the diffraction grating and by using a diffraction grating several $\mu$m thick. Moreover, fabrication of the scale becomes easier, because variations in grating pitch due to deformation of the material, which is often produced during the fabrication of a hologram. are small for the reason that the grating surface is perpendicular.

Figure 15:
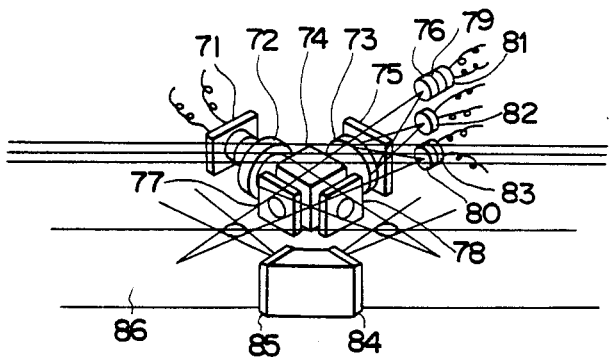
FIG. 15 is a perspective view showing a concrete example of the construction of the arrangement shown in FIG. 11.

FIG. 15 is a perspective view showing a concrete construction of the arrangement shown in FIG. 9, in which reference numeral 71 indicates a semiconductor laser device; 72 and 73 represent condenser lenses; 74 is a polarizing beam splitter; 75 is a grating for dividing incident wave; 76, 77 and 78 are $\lambda/4$ plates; 79 and 80 are polarizing plates; 81, 82 and 83 are photodetectors for sinuous wave, for monitoring and for consinuous wave, respectively; 84 and 85 are mirrors; and 86 is a volume type hologram scale.

For this example, a semiconductor laser device 71 is used as a light source; a polarizing beam splitter is used as a beam splitter, and the signal light beam is separated from the incident beam by means of a $\lambda/4$ plate. Moreover, the signal light beam is divided into 3 by means of a grating so disposed that the direction of the grating vector is perpendicular to the hologram for the scale and in this manner sinuous signals, cosinous signals and monitoring signals are obtained.

In the instrument thus constructed, since a part of the incident light, which is proportional to a square of the diffraction efficiency, is obtained as signal light, for example using a scale having a diffraction efficiency of 90%, it is possible to obtain signal light having an intensisty of 80% with respect to that of the incident light. Although it is known that returning light to the semiconductor laser device gives rise to noise, there is almost no returning light in this case.

As explained above, since an optical instrument for measuring displacement constructed as indicated above comprises a light source, a beam splitter for dividing the beam emerging from the light source into two, a diffracting grating on which these two split beams are projected, reflectors on which two light beams diffracted by the diffraction grating are projected and which return the diffracted light beams toward the diffraction grating, and detectors for detecting interference light of these two diffracted light beams and is so constructed that the two diffracted light beams are made to interfere by the beam splitter and variations in position of the diffraction grating are obtained by measuring interference intensity by means of the detectors and the, following results can be obtained.

1. Variations in wavelength of the light source used do not give rise to deterioration of the detected signals or cause measurement errors.

2. It is possible to effect measurements which are independent of displacements of the diffraction grating in the two directions orthogonal to the grating vector.

3. A diffraction grating having a high diffraction efficiency such as a volume type hologram can be used as a scale so that detection signals of high quality can be obtained.

4. Since it is possible to use a great angle between the diffracted light beam of 0th order and that of 1st order, the resolving power is maintained.

Moreover, when a multimode semiconductor laser device is used as a light source in an optical instrument for measuring displacement according to this invention, in which a movable diffraction grating is used as a scale and displacement of the diffraction grating is measured by using interference signals of the diffracted light beams, since non-reflection coating on optical parts is unnecessary, it is possible to use optical parts which are not expensive. Furthermore the S/N ratio is improved with respect to that obtained by using a single mode laser device. Besides these advantages the, following effects advantages can be obtained.

1. Since the difference between the optical path length of the two beams can be detected, it is possible to effect adjustment of the optical path lengths easily with a high precision.

2. Since the adjustment situation can be monitored, it is avoided that one makes measurements without knowing that variations in wavelength of the light source give rise to errors.

3. It is prevented that interference signals vary due to unnecessary light.

4. Moreover by constructing the detector circuit as shown in FIGS. 3 and 5, it is possible to obtain a large output signal and D.C. components of the signal can be cancelled and the device has only a few parts including a cancelling circuit and thus the reliability is improved.

The embodiments of the invention in which an exclusive property or privilege is claimed are defined as follows:

1. In an optical instrument for measuring displacement comprising a movable diffraction grating used as a scale, a light source, said diffraction grating illuminated by said light source and producing two or more diffracted beams, means for causing said two or more diffracted beams to interfere with each other, and two or more photodetectors receiving and detecting said two or more diffracted beams from said causing means whereby displacement of said diffraction grating is detected based on variations of the outputs of said two or more photo detectors the improvement wherein said light source is a multimode semiconductor laser device having a coherency enabling only two of said diffracted beams with an equal optical path length to interfere with each other.

2. An optical instrument for measuring displacement according to claim 1, wherein each of said photodetectors comprises a polarizing beam splitter arranged to receive said two or more interfered beams for dividing the incident light beam into two, one of which is a light beam proceeding along a first optical path which is the direction of the incident light beam and the other of which is a light beam proceeding along a second optical path, a first photo diode which is mounted on said first optical path, a second photo diode which is mounted on said second optical path, a first photo diode which is mounted on said first optical path, a second photo diode which is mounted on said second optical path, said first and second photo diodes connected in series, a reverse bias source connected to said first and second photo diodes, and an amplifier with its input connected to the connection point of said first and second photo diodes, said amplifier producing detected signals which contain no D.C. component when interference light enters said beam splitter.

3. In an optical instrument for measuring displacement comprising a movable diffraction grating used as a scale, a light source, said diffraction grating illuminated by said light source and producing two or more diffracted beams, means for causing said two diffracted beams to interfere with each other, and two photodetectors receiving and detecting said two diffracted beams from said causing means, whereby displacement of said diffraction grating is detected based on variations of the outputs of said two photodetectors, the improvement wherein the difference in optical path length between said two diffracted beams which interfere with each other is detected based on variations in the outputs of said two photodetectors and said outputs of said photodetectors are used to adjust the optical path length of said two diffracted beams as to reduce errors due to said light source wavelength variations and to said optical path length differences.

4. In an optical instrument for measuring displacment comprising a movable diffraction grating used as a scale, a light source for producing a beam to be diffracted by said diffraction grating to produce two or more diffraction beams, means for causing said two beams diffracted by said diffraction grating to interfere with each other, and photodetectors for detecting an interference pattern, the improvement whereby means are provided which respond to the output of said photodetectors so that the errors in said beam due to the differences in optical path length between said two beams and errors due to light source wavelength variations are maintained less than predetermined values.

5. An optical instrument for measuring displacement according to claim 4, further comprising means for examining variations in modulation of said output, and means for stopping the measurement in mid-course when said difference between the optical path lengths of said two beams is greater than a predetermined value.

6. An optical instrument for measuring displacement, comprising a light source composed of a semiconductor laser device, a beam splitter for dividing a beam emerging from said light source into two split beams, a diffraction grating on which the two split beams are projected, and reflectors which reflect the two first order beams diffracted by said diffraction grating and redirect them to said diffraction grating, the reflected first order diffraction beams being diffracted again by said diffraction grating, and the two first order diffraction beams thus rediffracted being caused to interfere with each other by said beam splitter.

7. An optical instrument for measuring displacement according to claim 6, further comprising second reflectors on the same side as said beam splitter with respect to said diffraction grating for directing said emerging beam and said rediffracted diffraction beams between said beam splitter and said diffraction grating.

8. An optical instrument for measuring displacement according to claim 6, wherein said diffraction grating is a volume type hologram, the direction of the grating vector of said hologram coinciding with the measurement direction.

9. An optical instrument for measuring displacement according to claim 6, wherein said reflectors are located below said diffraction grating.

* * * * *